C. G. CARLBERG.
PLOWING MACHINE.
APPLICATION FILED SEPT. 1, 1916.

1,282,377.

Patented Oct. 22, 1918.
5 SHEETS—SHEET 2.

Inventor
C. George Carlberg
By Hiram A. Sturges,
Attorney

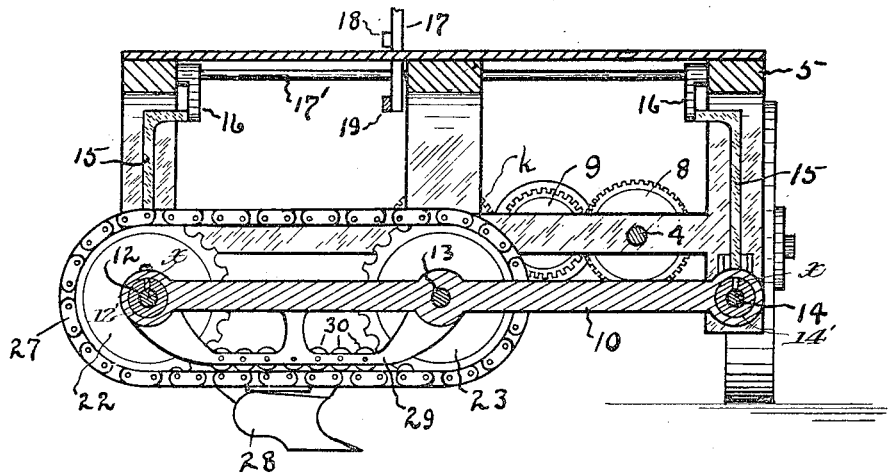
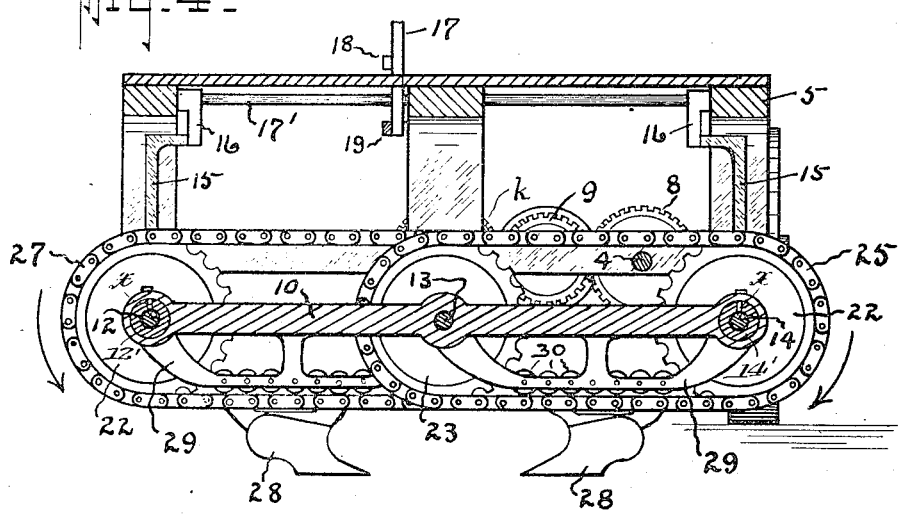

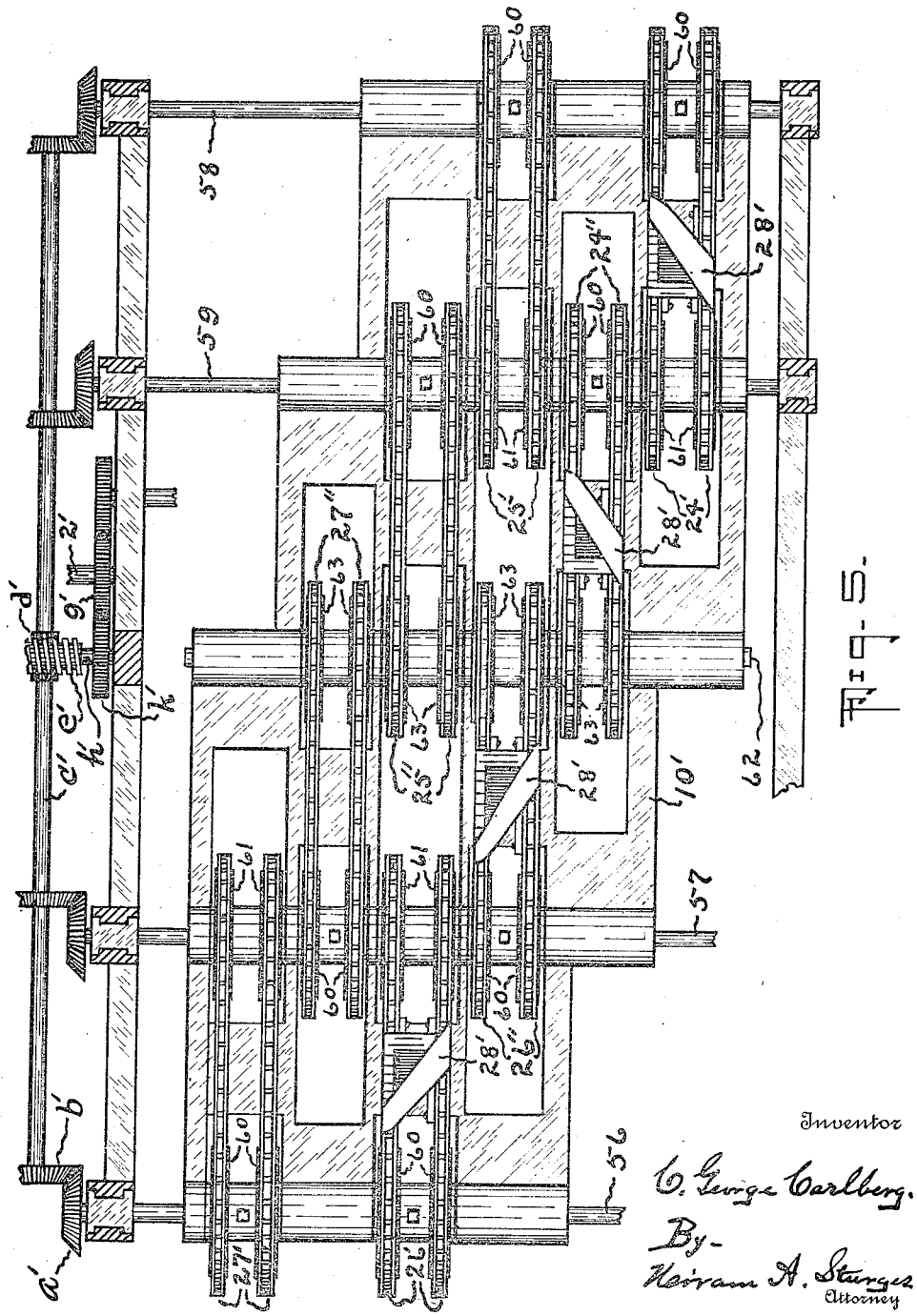

C. G. CARLBERG.
PLOWING MACHINE.
APPLICATION FILED SEPT. 1, 1916.
1,282,377.
Patented Oct. 22, 1918.
5 SHEETS—SHEET 5.
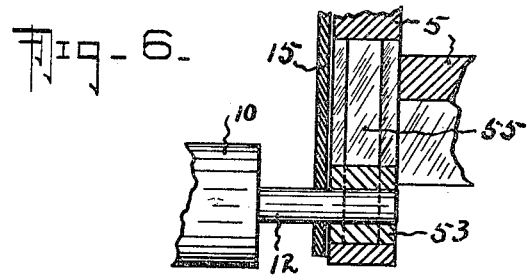
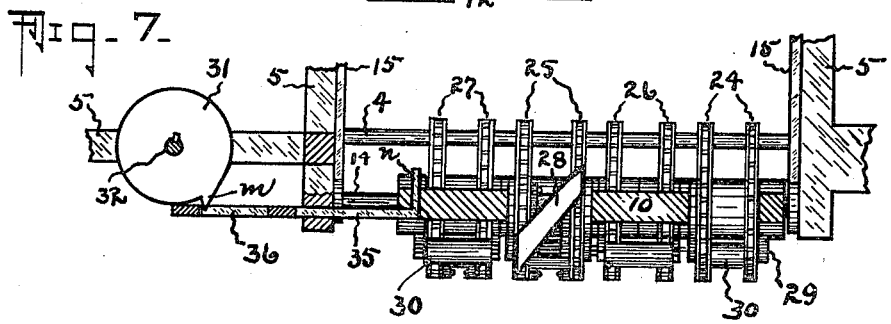
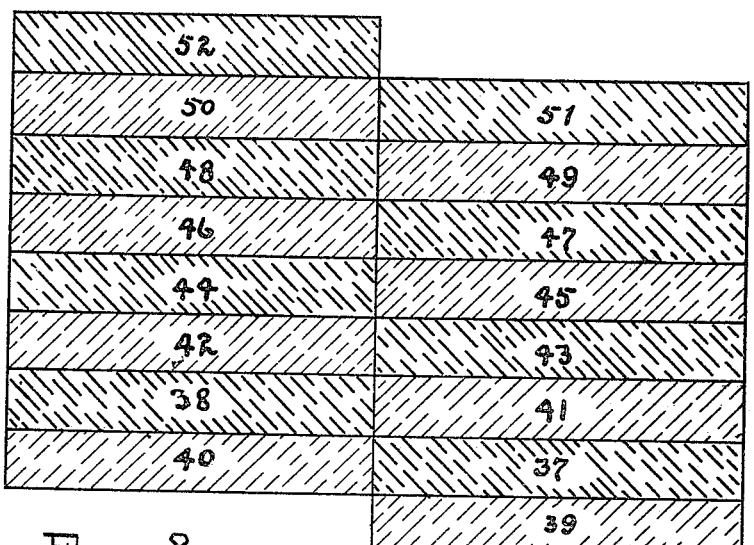
Inventor
C. George Carlberg.
By Hiram A. Sturges.
Attorney

UNITED STATES PATENT OFFICE.

CARL GEORGE CARLBERG, OF OMAHA, NEBRASKA.

PLOWING-MACHINE.

1,282,377.　　　　Specification of Letters Patent.　　Patented Oct. 22, 1918.

Application filed September 1, 1916. Serial No. 118,015.

*To all whom it may concern:*

Be it known that I, CARL GEORGE CARLBERG, a citizen of the United States, residing at Omaha, in the county of Douglas and State of Nebraska, have invented certain new and useful Improvements in Plowing-Machines, of which the following is a specification.

The object of the invention, broadly, is to provide a machine by means of which a comparatively large area of ground may be plowed or cultivated within, comparatively, a very limited time and with less than ordinary power, the parts employed to be few and simple so that manufacture will be convenient and economical, and so arranged that they will sustain stresses incident to their use to advantage.

The invention is illustrated in connection with a motor vehicle adapted to be driven through a field or upon other ground to be plowed or tilled, the furrows being formed transversely to the line of travel so that the power from the engine may be applied to advantage, traction not being depended upon in connection with the force or power for moving the plows.

The invention consists of the novel construction, combination and arrangement of parts as described herein and claimed, and as illustrated in the accompanying drawing, it being understood that changes in form, size, proportion and minor details may be made without departing from the invention or sacrificing any of its advantages, as defined by the appended claims.

Figure 1:
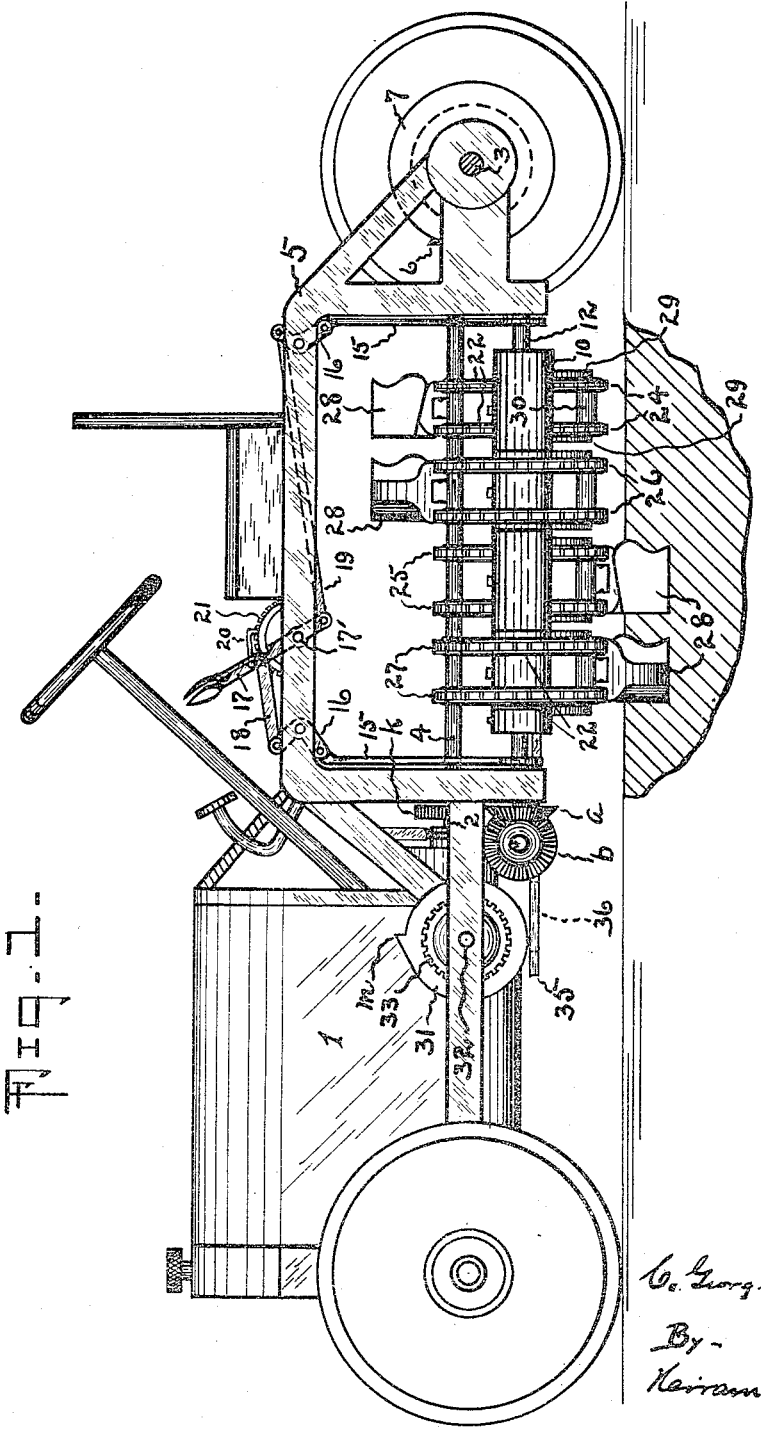
Figure 2:
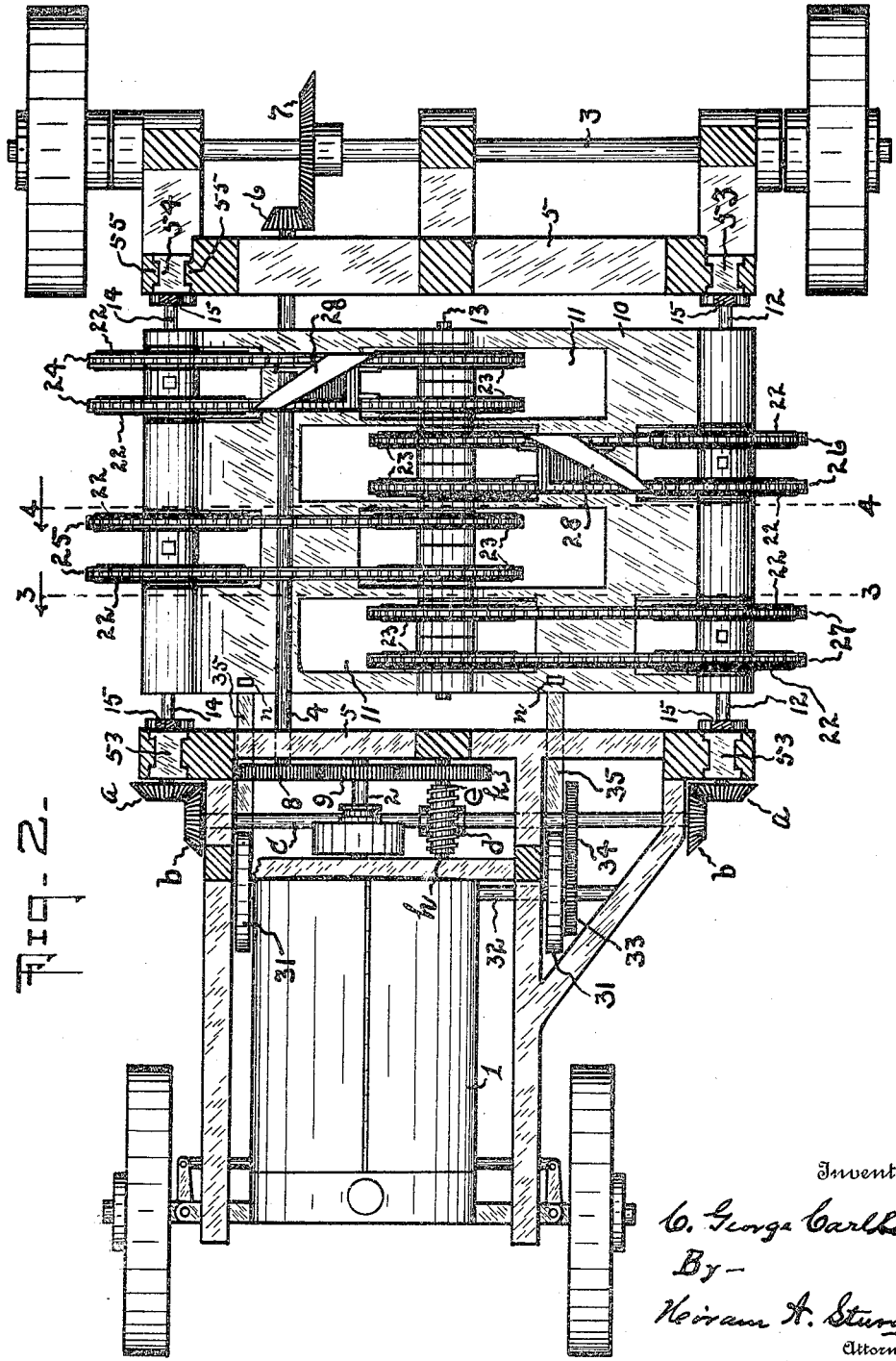

In the drawing, which illustrates one embodiment of the invention, Figure 1 is a view of the machine in side elevation, one of the vehicle wheels being removed. Fig. 2 is a plan view of the machine, the driver's seat and upper part of the vehicle frame being removed to more clearly show construction of the carrier frame. Fig. 3 is a transverse section through the carrier frame on line 3 3 of Fig. 2. Fig. 4 is a transverse section through the carrier frame on line 4 4 of Fig. 2. Fig. 5 shows a modified form of a carrier frame which may be employed, the number of endless carriers and plows being increased. Fig. 6 is a detail showing the preferred mounting for the ends of the operating shafts. Fig. 7 is a broken away view in longitudinal section through a part of the machine to show operation of the cam and shifting bar. Fig. 8 is a diagrammatic view showing an area of plowed ground to illustrate the formation of furrows.

Referring now to the drawing for a more particular description, any suitable vehicle may be employed, adapted to be moved by any desired force or means, the means herein shown being the engine 1, its shaft 2 being adapted to cause a rotation of the rear axle 3, since a line shaft 4 is provided and has bearings in the vehicle frame 5, the rear end of said line shaft being provided with a miter gear 6 engaging the miter gear 7 of said axle, the front end of said shaft 4 being provided with a pinion 8 engaging the pinion 9 of the engine shaft.

In order that stresses may be directed transverse to the line of travel and also that a considerable area of ground may be tilled or plowed while the vehicle is moving forwardly, and also to the end that the greater part of the power of the engine may be utilized for plowing, I provide a carrier frame which is herein illustrated as a horizontal platform 10 having numerous rectangular apertures 11 formed therein, said platform being traversed longitudinally by the parallel operating shafts 12 and 14 and the idler shaft 13 (Figs. 3, 4).

The carrier frame may be elevated or lowered with reference to the vehicle frame for convenience when "turning about" in a field or for driving upon a highway, or when moving from one field to another, the means for this purpose consisting, in part, of links 15 which are connected at their lower ends with the ends of the shafts 12 and 14, the upper ends of the links being connected with the bell cranks 16 which are mounted upon the vehicle frame. By causing a swinging movement of the hand lever 17 (Fig. 1.) which is mounted between its ends on the shaft 17′, an operator may readily elevate or may lower the carrier frame, said lever being provided with links 18 and 19 which are connected with the bell cranks, and also being provided with a pawl 20 for engaging a toothed sector 21, so that the carrier frame may be maintained in the lowered or elevated positions mentioned.

The degree of rotation of shafts 12 and 14 are arranged to be uniform with reference to each other. Their respective front ends are provided, preferably with miter gears *a* in engagement, normally, with miter gears *b* of the transverse shaft *c*, said shaft being provided with the toothed gear *d* engaged by the worm $e$ of the stub shaft $h$, said shaft $h$ being provided with the pinion $k$ in engagement with the pinion 9 of the engine shaft.

Keyed upon sleeves 12' and 14' of the respective shafts 12 and 14 are a plurality of sprocket wheels 22 arranged in pairs, and mounted as idlers on the shaft 13 are sprocket wheels 23 also arranged in pairs. As best shown in Fig. 2, endless carriers or sprocket chains are provided and arranged in pairs, as the pairs of chains 24 and 25, each pair being mounted upon a pair of wheels 22 of shaft 14 and upon a pair of wheels 23 of the idler shaft 13.

Numerals 26 and 27 indicate endless carriers or sprocket chains also arranged in pairs, each pair being mounted upon a pair of wheels 22 of shaft 12 and upon a pair of wheels 23 of said idler shaft 13, and upon each pair of sprocket chains is mounted a plow member 28, which may be of any suitable form for engaging the ground.

The rotatable movements of shafts 12 and 14 are so arranged that the lower parts of sprocket chains 24 and 26 will move toward each other as indicated by the arrows in Fig. 4, and also on account of the rotation of said shafts the lower parts of the sprocket chains 25 and 27 will move toward each other and toward the middle of the carrier frame.

Numerals 29 indicate braces disposed below and carried by the platform, each being provided with rollers 30 for engaging the sprocket chains to resist upward stresses directed to said chains by the plow members while engaging in the ground.

In order that the carrier frame 10 will not have a forward movement while the plow members engage the ground and while the vehicle is moving forwardly, any suitable means are provided for causing an intermittent, longitudinal movement of said frame, the means herein shown for that purpose being the pair of cams 31, each provided with a peripheral projection $m$, said cams being mounted on the transverse shaft 32, the shaft 32 being provided with a pinion 33 in engagement with the pinion 34 of the shaft $c$. The carrier frame is provided with a pair of shifting bars 35 which extend forwardly of the carrier frame adjacent to the cams, each bar having a transversely disposed arm engaging in an aperture $n$ of the carrier frame to permit vertical movements of said frame, and provided with a slot 36; and the parts are so arranged that while the plow members are disposed in alinement with the horizontal platform, being then above and substantially equi distant from ground, the projections $m$ of the cams will simultaneously engage the bars 35 within the slots 36, with the result that said bars, together with the platform and parts carried thereby, will be shifted forwardly, the sleeves 12' and 14' being splined on the respective shafts 12 and 14, as indicated at $x$ in Figs. 3 and 4.

The construction therefore is such that the vehicle may be driven forwardly, at which time the plow members will move substantially at right angles to the line of travel to form the furrows, the carrier frame or platform 10 remaining stationary while the plows engage the ground. While the plows upon the sprocket chains 24 and 26 are in the ground, the plows upon the sprocket chains 25 and 27 will be disposed above the platform, and the extent of the forward shifting movement of the frame 10 will be substantially equal to the width of a furrow.

It may be stated that during the intermittent longitudinal movement of the frame 10, while said frame remains stationary, the plows upon the sprocket chains 25 and 27 will form the furrows, respectively indicated at 37 and 38, shown in Fig. 8, at which time the plows upon the pairs of chains 24 and 26 are disposed above the platform.

When the plows upon the pairs of chains 25 and 27 have caused the furrows 37 and 38 to be completed, and while all of the plows are in line with the platform and near the ground, the frame 10 will be shifted forward by the means described, and the plows upon chains 24 and 26 will then form the furrows 39 and 40.

The shifting of the frame 10 therefore occurs twice during the time required for a plow to complete its orbicular movement or cycle, with the result that, during the forward movement of the vehicle thereafter, the furrows at the alternate, rectangular areas indicated at 43, 44, 47, 48, 51 and 52, shown in Fig. 8, will be formed by the plows upon the respective pairs of chains 25 and 27, and the furrows indicated at 41, 42, 45, 46, 49 and 50 will be formed by the plows upon the respective pairs of carriers or chains 24 and 26, the area between the pairs of chains 24 and 25 being substantially equal to the area between the pairs of chains 26 and 27, as best shown in Fig. 2.

It is understood, of course, that the furrows will be thrown transversely of the line of movement of members 28 whether said members are formed as plows or disks, depending, so far as the width of the furrow is concerned, upon the form of said members, and while in the drawing I have shown comparatively large plows 28, I may substitute therefor ground-engaging members of any suitable size or form useful for plowing or tilling the ground, operation of the other parts not depending upon the shape of said members 28.

Numerals 53 (Figs. 2, 6,) indicate coupling blocks provided with grooves 54 in which the ends of shafts 12 and 14 are mounted, the vehicle frame being provided with ridges 55, and when, by operation of the hand lever 17, the carrier frame 10 is elevated or lowered, the blocks move vertically, the ridges 55 engaging in said grooves 54.

The modified form of the carrier frame shown in Fig. 5 illustrates the use of the invention with four operating shafts 56, 57, 58 and 59, upon the sleeves of said shafts being keyed the pairs of sprocket wheels indicated at 60, upon the sleeves of the operating shafts 57 and 59 also being disposed the pairs of sprocket wheels 61 mounted as idlers, an idler shaft 62 being employed, upon which are mounted to rotate as idlers the sprocket wheels 63, all of the shafts traversing the carrier frame 10'.

At c' is indicated a transverse shaft provided with miter gears b' normally in engagement with the miter gears a' of the operating shafts to cause their rotation, the shaft c' being rotated by means of the worm e' in engagement with the toothed gear d' of said shaft c', the worm being rotatable by means of the engine shaft 2' since the gear 9' of the engine shaft engages the gear k' of the stub shaft h'.

It will be noted that the construction for this modified form may be used to advantage, especially when the machine is used upon substantially level ground, the number of carriers and plows being increased so that a greater area may be cultivated while the vehicle is moving forwardly than heretofore shown, the operation being substantially the same as already explained; and no further description of this modified form is necessary, except to state that upon each pair of sprocket chains a plow 28' is mounted, the several pairs of sprocket chains being indicated at 24', 24'', 25', 25'', 26', 26'', 27' and 27''. It is considered that the scope of the invention is such that the number of operating shafts, sprocket chains and plow members may be increased, as may be desired.

It is understood that the operating shafts, if desired, may be actuated independently of the engine shaft which moves the vehicle, but since only a limited force is required for the movement of the vehicle, such independent force for moving the plow members is not necessary, and it is preferred to employ the force of the engine shaft for the operation of plowing, another advantage being that the movement of the endless carriers upon which the plows are mounted will correspond in speed to the movement of the vehicle. If the engine shaft has a higher degree of rotation to increase the speed of the vehicle, the orbicular movement of the endless carriers and plows will be correspondingly increased.

Having fully described construction, a further explanation relating to operation is not necessary.

What I claim as my invention and desire to secure by Letters Patent is:—

1. In a machine for the purpose described, the combination with the rotatable shaft of a motor driven vehicle, an operating shaft, a second operating shaft, said operating shafts being disposed longitudinally of the vehicle and rotatable by the shaft of the motor, a pair of carriers disposed transversely of the vehicle adjacent to each other and movable by the first named operating shaft, a second pair of carriers disposed transversely of the vehicle adjacent to each other and movable by the second operating shaft, said carriers being provided with earth-working members, each second carrier being disposed rearwardly of a first named carrier, and means for simultaneously shifting said carriers longitudinally of the vehicle.

2. In a machine for the purpose described, the combination with a forwardly movable vehicle, a plurality of endless carriers disposed adjacent to each other and movable transversely of the vehicle, a second plurality of endless carriers disposed adjacent to each other and movable in a direction reverse to the movement of the first named endless carriers, earth-working members mounted on said carriers, each second endless carrier being disposed rearwardly of a first named endless carrier, and actuated mechanism for simultaneously shifting said carriers longitudinally of the vehicle while said vehicle is moving.

3. A machine for the purpose described, comprising, in combination with the driving shaft of an engine-driven vehicle, a carrier frame on the vehicle, endless carriers circumscribing the carrier frame and provided with earth-working members, means actuacted by the driving shaft for moving the endless carriers transversely of the line of travel of the vehicle, and means for shifting the carrier frame longitudinally of the vehicle after the endless carriers have performed a cycle of movement.

4. In combination with the driving shaft of an engine-driven vehicle, a carrier frame connected with the vehicle, endless carriers provided with earth-working members and mounted on the carrier frame, means to permit the carrier frame to remain stationary at successive intervals while the vehicle is moving, and means for moving the endless carriers while the carrier frame is stationary.

5. In a machine for the purposes described, a vehicle provided with means for locomotion, a carrier frame connected with the vehicle, endless carriers provided with earth-working members and mounted on the carrier frame, means for raising and lowering the carrier frame, means for holding the carrier frame stationary at successive intervals while the vehicle is moving, and means for moving the endless carriers while the carrier frame is stationary.

6. In combination with the driving shaft of an engine-driven vehicle, a carrier frame provided with a shifting-bar and connected with the vehicle, operating shafts mounted on the carrier frame and provided with sprocket wheels, endless carriers mounted on the sprocket wheels and provided with earth-working members, said operating shafts being revoluble by the driving shaft for moving the carriers and earth-working members transversely of the line of travel of the vehicle, and a revoluble cam for engaging the shifting-bar to cause movements of the carrier frame longitudinally of the vehicle.

7. In combination with the driving shaft of an engine-driven vehicle, a carrier frame connected with the vehicle, operating shafts on the carrier frame and provided with sprocket wheels, endless carriers on the sprocket wheels provided with earth-working members, said operating shafts being revoluble by the driving shaft for moving the earth-working members transversely of the line of travel of the vehicle, and means to cause intermittent movements of the carrier frame longitudinally of the vehicle while the vehicle is moving.

8. In combination with the driving shaft of an engine-driven vehicle, a carrier frame connected with the vehicle, operating-shafts revoluble by the driving shaft and mounted on the carrier frame, earth-working members movable transversely of the line of travel of the vehicle by the revoluble movements of the operating-shafts, means to cause vertical reciprocation of the carrier frame, and means to cause intermittent movements of the carrier frame longitudinally of the vehicle while the vehicle is moving.

9. In combination with the driving shaft of an engine-driven vehicle, a carrier frame connected with the vehicle, mechanism connected with the driving shaft for causing intermittent movements of the carrier frame longitudinally of the vehicle, endless carriers provided with plow members, mechanism connected with the driving shaft for moving each endless carrier during the movement of the vehicle and during the intervals between the intermittent movements of the carrier frame.

In testimony whereof I have affixed my signature in presence of two witnesses.

C. GEORGE CARLBERG.

Witnesses:
 HIRAM A. STURGES,
 L. M. THOMAS.

Copies of this patent may be obtained for five cents each, by addressing the "Commissioner of Patents, Washington, D. C."